(12) United States Patent
Gupta

(10) Patent No.: US 12,483,560 B2
(45) Date of Patent: Nov. 25, 2025

(54) INTEGRATION OF ANONYMIZED, MEMBER-DRIVEN CLOUD-BASED GROUPS AND CONTENT DELIVERY SERVICES THAT COLLECT INDIVIDUAL INFORMATION ABOUT CONTENT INTERACTIONS WITHOUT COMPROMISING IDENTITIES OF GROUP MEMBERS

(71) Applicant: Oracle International Corporation, Redwood Shores, CA (US)

(72) Inventor: Siddharth Gupta, Edison, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 18/159,013

(22) Filed: Jan. 24, 2023

(65) Prior Publication Data

US 2024/0031373 A1 Jan. 25, 2024

Related U.S. Application Data

(60) Provisional application No. 63/392,055, filed on Jul. 25, 2022.

(51) Int. Cl.
*H04L 9/40* (2022.01)
*G06F 21/62* (2013.01)

(52) U.S. Cl.
CPC ........ *H04L 63/104* (2013.01); *G06F 21/6254* (2013.01); *H04L 63/102* (2013.01)

(58) Field of Classification Search
CPC .. H04L 63/102; H04L 63/104; G06F 21/6254
See application file for complete search history.

(56) References Cited

U.S. PATENT DOCUMENTS

2019/0354989 A1* 11/2019 Saket ..................... G06Q 20/42
2020/0250295 A1* 8/2020 Padmanabhan ....... H04L 63/102
(Continued)

FOREIGN PATENT DOCUMENTS

WO 2019/086553 A1 5/2019

OTHER PUBLICATIONS

Al-Zaben et al., "General Data Protection Regulation Complied Blockchain Architecture for Personally Identifiable Information Management", 2018 International Conference on Computing, Electronics & Communications Engineering (iCCECE), 2018, pp. 77-82.

*Primary Examiner* — Frantz B Jean
(74) *Attorney, Agent, or Firm* — Invoke

(57) ABSTRACT

Techniques are described through which groups of individuals and/or other entities may interface with a data cloud blockchain network and/or cloud-based platform to collectively share data in a secure, controlled manner. Decentralized groups that are connected to the data cloud network may be registered and listed in a searchable directory. Entities that are interested in accessing data associated with a group may browse the directory, execute smart contracts within a blockchain, and track online content interactions of a group in a manner that does not compromise the anonymity of individual group members. Data usage and performance metrics may be tracked on the blockchain network using data cloud services, and the metrics may be written to distributed ledgers within the blockchain network. Smart contracts and chaincode within the network may initiate blockchain transactions based on performance metrics and/or other aspects associated with accessing information about a group.

24 Claims, 8 Drawing Sheets

(56) References Cited

U.S. PATENT DOCUMENTS

2021/0303552 A1     9/2021   Pandey et al.
2021/0406398 A1*   12/2021   Brannon ............... G06F 21/552

* cited by examiner

INTEGRATION OF ANONYMIZED, MEMBER-DRIVEN CLOUD-BASED GROUPS AND CONTENT DELIVERY SERVICES THAT COLLECT INDIVIDUAL INFORMATION ABOUT CONTENT INTERACTIONS WITHOUT COMPROMISING IDENTITIES OF GROUP MEMBERS

RELATED APPLICATIONS; INCORPORATION BY REFERENCE

The following application is hereby incorporated by reference U.S. Provisional Patent Application 63/392,055, filed Jul. 25, 2022. The applicant hereby rescinds any disclaimer of claims scope in the parent application(s) or the prosecution history thereof and advise the USPTO that the claims in the application may be broader that any claim in the parent application(s).

This application is related to application Ser. No. 16/835,169, titled DISTRIBUTED AND BLOCKCHAIN-BASED LEDGERS FOR DATA CLOUD SERVICES, which is hereby incorporated by reference.

TECHNICAL FIELD

The present disclosure relates to distributed computing systems and architectures. In particular, the present disclosure relates to the integration of anonymized, member-driven cloud-based groups and content delivery services.

BACKGROUND

Cloud-based data management platforms include networked computing resources for collecting and managing data transactions between multiple entities. Applications and content delivery services may leverage data from the platform to enhance various data-driven functions. For example, the cloud-based data management platform may also provide or enhance actionable insights to a consumer application by running big data, machine learning, and/or other artificial intelligence (AI) analytics on data managed by the platform. The insights may be used to perform targeted actions such as selecting an audience segment and rendering content in a manner that is more efficient and effective.

Data privacy, data integrity, and system scalability may be concerns among participants in a cloud-based data management platform. Data providers and consumers may not inherently trust other participants within the cloud system. Data breaches and unauthorized usage of data sets may expose a data provider and data consumer to various risks, including legal liability, exposure of confidential information to unauthorized entities, data corruption, and revenue loss. Further, inaccurate or low-quality data may limit or harm the performance of consumer applications, leading to ineffective and inefficient resource utilization. Large-scale systems may link thousands or more entities, increasing the risk of losing track of sensitive data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
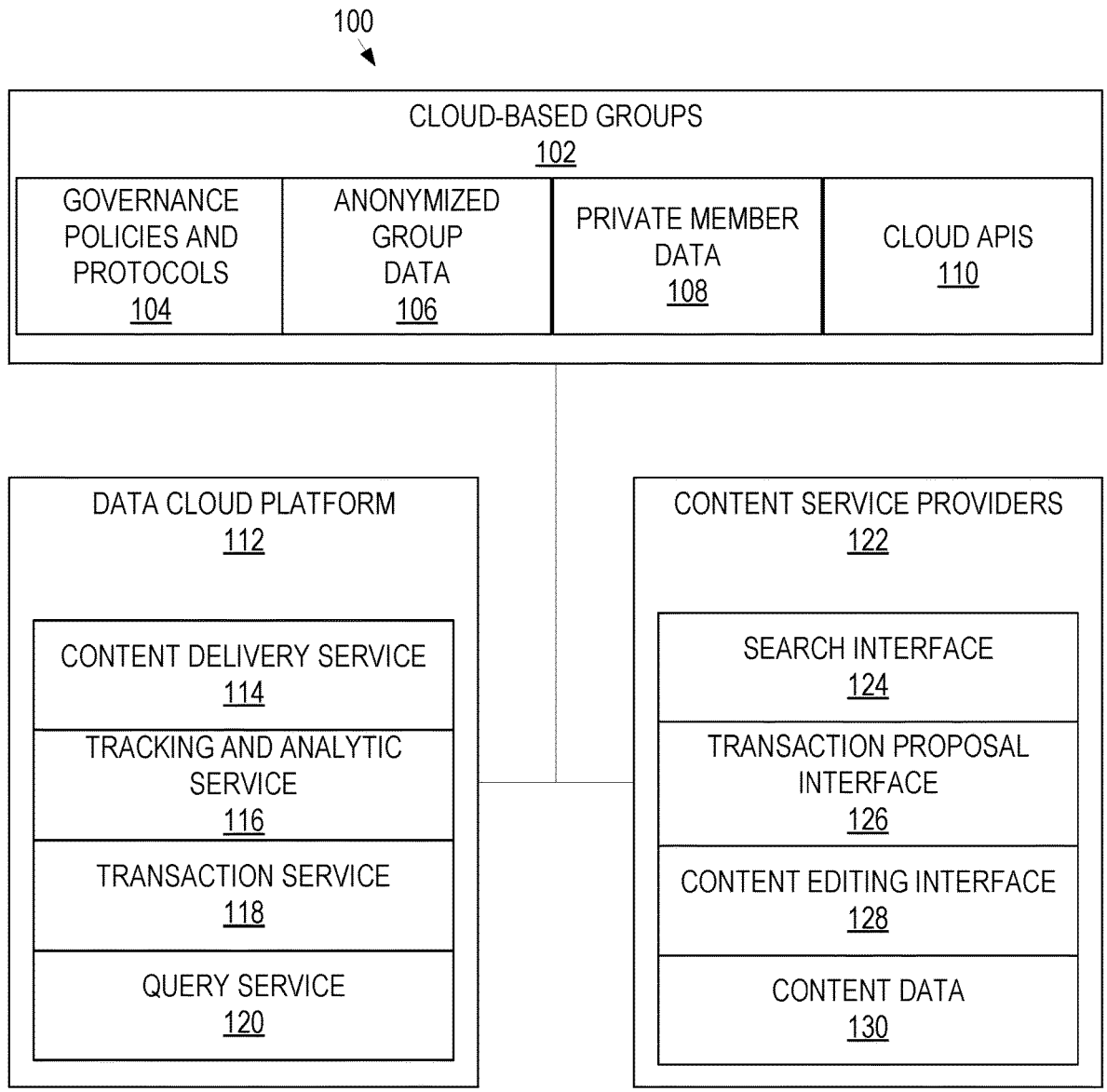
FIG. 1 illustrates an example set of cloud-based groups that are integrated into a data cloud network in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. INTEGRATION OF CLOUD-BASED GROUPS WITH DATA CLOUD SERVICES
3. MEMBER-DRIVEN POLICIES AND PROTOCOLS
4. GROUP OPAQUENESS
5. DISTRIBUTED LEDGERS AND PERMISSIONED BLOCKCHAINS
6. LEDGER TRANSACTION MANAGEMENT
7. SMART CONTRACTS FOR SHARING IDENTIFIERS AND OTHER DATA
8. DATA USAGE AND PERFORMANCE-BASED SMART CONTRACTS
9. LEDGER-BASED DELETION TRACKING AND PRIVACY CONTROLS
10. SMART CONTRACTS FOR AUTOMATICALLY MODIFYING SHARED DATA SETS
11. COMPUTER NETWORKS AND CLOUD NETWORKS
12. HARDWARE OVERVIEW
13. MISCELLANEOUS; EXTENSIONS

1. General Overview

Techniques are described for integrating anonymized, member-driven cloud-based groups and content delivery services within a shared platform. The techniques allow for content delivery services to collect individual information about content interactions associated with a group without compromising identities of the group members. Members of the group may benefit, both individually and at the group level, from sharing content interactions and/or other anonymized group information with content delivery services without worrying about sensitive information of individual group members being inadvertently exposed.

In some embodiments, cloud-based groups are associated with member-driven policies and/or protocols for engaging with entities that are external to the group. For example, the cloud-based groups may establish conditions for joining the group, define a group governance model including voting rights to regulate changes/actions taken by the group, and/or create/expose application programming interfaces (APIs) and/or code that controls access to data shared by the group. Thus, the member-driven policies and protocols may provide individual members with the ability to influence the conditions through which external entities are permitted to collect and/or otherwise access information about members of the group.

If an entity that is external to the group satisfies conditions for accessing data associated with the group, then access may be permitted in a manner that does not reveal the identifies of individual group members. For example, a data cloud platform may track content interactions at the level of the group using group identifiers that are shared by members of the group and do not expose individual member identifiers. Individual group members may choose to reveal the identities and engage directly with the content delivery service provider on an individual basis. However, the platform may prevent the content delivery service provider from determining the individual member's identities without the implicit or explicit consent of the individual group member.

In some embodiments, a data cloud platform provides services through which external entities may collect group-level information that is anonymized at the individual level. For example, a content delivery service provider may determine group-level impression counts for a set of content served to members of the group, statistics about how many members of the group interacted with the content, information about group sentiment with respect to the content, and/or other information about how the group interacted with the content. The data cloud platform may track content interactions at the group-level without exposing individual group member identifiers, personal identifying information (PII), or other data that is private at the individual member level.

In some embodiments, a data cloud platform includes a search interface through which entities may identify cloud-based group with which to engage. For example, entities may browse a directory or submit queries for groups that satisfy a set of criteria. Once a set of one or more target groups have been identified, the entity may submit requests to collect group-level information and/or otherwise access group-level data. Members of the group may vote on whether to accept the proposal from the external entity and/or set the terms for approving the engagement. Additionally or alternatively, members may pre-approve conditions under which external entities may access group-level data. By predefining and approving conditions that external entities must satisfy to engage with a group, members do not need to vote each time an external entity submits a request to access the group's data. Requests may be automatically approved or rejected based on whether the pre-approved conditions are satisfied.

In some embodiments, the data cloud platform may trigger one or more transactions based on the tracked content interactions of a cloud-based group. For example, a transaction may be executed to transfer digital tokens, coupons, currency, and/or other incentives from the entity accessing the data to the group. Additionally or alternatively, the data cloud platform may trigger other transactions, which may include blockchain transactions as described further herein. The consideration for accessing the group's data may be voted upon or otherwise determined based on a group's governance policies and protocols. Thus, the transactions executed by the data cloud platform may vary on a case-by-case basis.

In some embodiments, the cloud-based groups, content service providers, and/or other entities interface with a data cloud blockchain network to collectively share data in a secure, controlled manner. The cloud-based groups may create smart contracts that control access to data shared by the group, establish conditions for joining the group, enforce a group governance model including voting rights to regulate changes/actions taken by the group, and/or affect other transactions within the blockchain network. The cloud-based groups that are connected to the data cloud blockchain network may be registered and listed in a searchable directory. The directory may further include information about a registered group (e.g., group attributes) and/or a high-level description of the data being shared by the group. Advertisers and/or other entities that are interested in accessing the shared data may browse the directory, execute smart contracts within the blockchain to access data shared by one or more registered groups, and collect/use the data (e.g., for online campaigns, social relationship management services, and/or other applications). Data privacy may be maintained through the use of hashed identifiers or other data objects that are only useful in the data cloud blockchain environment. Data usage and performance metrics may be tracked on the blockchain network using data cloud services, and the metrics may be written to distributed ledgers within the blockchain network. Smart contracts/chaincode within the network may include reconciliation transactions whereby groups and/or individual members thereof are compensated based on usage and/or performance metrics associated with shared data. Blockchain tokens and/or cryptocurrency may be used to compensate groups and/or individual group members. Separate smart contracts may govern blockchain transactions between individual members of a decentralized group and the decentralized group as a unit within the blockchain network.

One or more embodiments described in this Specification and/or recited in the claims may not be included in this General Overview section.

2. Integration of Cloud-Based Groups With Data Cloud Services

FIG. 1 illustrates an example set of cloud-based groups that are integrated into a data cloud network in accordance with some embodiments. As illustrated in FIG. 1, system 100 includes cloud-based groups 102, data cloud platform 112, and content service providers 122. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. In some cases, multiple components may be combined into one application and/or machine. Operations described with respect to one component may instead be performed by another component.

Cloud-based groups 102 represent private groups established using one or more cloud services. Different groups may be established using the same cloud platform and/or different cloud platforms. Example cloud-based groups may include Facebook® groups, Discord® groups/servers, Slack® channels, and private groups established through other social media platforms. Users may connect to the cloud services using a client application, such as a browser or mobile application, to join and sign into private groups.

Once connected to a private group, the cloud service may permit the user to execute operations that are only permitted by verified and authenticated group members. For example, a user may communicate with one or more other members of the group using Voice over Internet Protocol (VoIP), instant messaging, short message service (SMS), and video calls through private chats with other members or with the entire group. Additionally or alternatively, users may perform other operations including voting and other group governance tasks as discussed further herein. One or more of the functions may be specific to the cloud platform through which the group was formed.

In some embodiments, cloud-based groups 102 are associated with governance policies and protocols 104, anonymized group data 106, private member data 108, and cloud APIs 110. Governance policies and protocols 104 define rules and procedures for managing the group, which may include member-driven rules and procedures enabling group members to self-govern. For example, governance policies and protocols 104 may define voting protocols through which members may vote to engage with external parties and/or execute other group-level operations. Members may further vote whether to engage in other group-based operations, such as admitting a new member to a group, sharing group-level data with external entities, and managing blockchain transactions within a blockchain network that is private to the group.

Anonymized group data 106 includes data that identifies attributes of a cloud-based group, such as the group name, group interests, and other shared member attributes. For example, a private group may be dedicated to discussing a particular topic, such as a sports team, profession, or activity in which the members are interested. Additionally or alternatively, group-level data 106 may include information about interactions of group members with online content at the level of the group. Examples may include total impressions representing a total count or percentage of members in the cloud-based group that viewed or were served content, click-through rates representing a total count or percentage of members in the cloud-based group that clicked on the content when rendered in a client application, ratings representing an average group rating for content, and sentiment representing whether the overall group viewed the content positively or negatively. However, the group-level information that is defined and collected may vary from implementation to implementation.

Anonymized group data 106 does not include private member data 108 such as personal identifying information for individual members of the group, member social media handles, SMS numbers, private group messages, and other content restricted to members of the group. Group messages and other content that is shared by one group member with other members of the group may be protected by the authenticated cloud service. In particular, the cloud service permits only authenticated members of the cloud-based group to view such private data. For example, group messages may be encrypted, restricting access to only members of the group holding encryption keys for decrypting the private data. Members that are signed into a cloud-based account may access and use the encryption keys to view the private communications using a client application. External entities may thus be prevented from accessing and viewing private member data 108 as they do not have access to the encryption keys owned by members of the cloud-based group.

Cloud APIs 110 may provide an interface through which cloud-based groups 102 communicate with data cloud platform 112 and/or content service providers 122. In some embodiments, cloud APIs 110 provide an interface through which group members may register with data cloud platform 112, receive transaction proposals from content service providers 122, send acceptances or rejections of the transaction proposals, and/or provide anonymized group data to data cloud platform 112 and/or content service providers 122. Cloud APIs 110 may conform to the architecture of a RESTful API and may operate on HTTP requests that invoke functions for engaging with the group. However, the APIs may conform to other architectural styles depending on the particular implementation.

Data cloud platform 112 includes services for facilitating digitized agreements and transactions between cloud-based groups 102 and content service providers 122. In some embodiments, the services include content delivery service 114, tracking and analytic service 116, transaction service 118, and query service 120. A service may correspond to a web service or process running on one or more servers. As previously noted, the components, including services, of system 100 may be combined, omitted, or otherwise vary from implementation to implementation.

In some embodiments, content delivery service 114 serves targeted content to client applications such as web browsers, mobile applications, and set-top boxes. Content delivery services 114 may monitor web traffic on one or more sites and extract information about the cloud-based groups to which visitors of a webpage or users of a mobile application belong. For example, server running a cloud-based service may generate an HTTP cookie authenticating that a user is logged into a cloud-based group, such as a particular social media private channel, and information about the cloud-based group. The HTTP cookie may include a group identifier and/or other anonymized group level data. A second server running content delivery service 114 may access the HTTP cookie from a client-side application when the user visits a website or access a mobile application page to identify the anonymized group information associated with cloud-based groups to which the user belongs. Content delivery service 114 may determine whether the anonymized group identifiers match identifiers for an audience segment defined for a particular set of content. If the group identifier matches, then the second server may transmit the content to the client-side application, which may render the content within a page of the client-side application. If the group identifier does not match, then the second server may refrain from transmitting the content. Thus, the second server may operate on the anonymized group information to selectively render content, thereby optimizing the user's browsing experience without compromising the user's anonymity. Further, the resources used to generate and serve content may be used more efficiently and effectively, avoiding wasting resources on user's that are not likely interested in a particular set of content. Operating on the cookie data also allows the webserver to deliver content to web browsers or mobile applications with minimal latency, hundreds or even thousands of times per second.

Tracking and analytic service 116 may collect/update anonymized group data for cloud-based groups and run analytics on the data. For example, tracking and analytic service 116 may track how many times a particular content item was served by content delivery service 114 to members of a cloud-based group. Tracking and analytic service 116 may maintain a counter for the content item that is incremented each time the group identifier extracted from an HTTP cookie is matched for the cloud-based group and the content is rendered. Additionally or alternatively, tracking and analytic service 116 may track and update other metrics and anonymized group information. As previously mentioned, the metrics may include click-through rates, user ratings, sentiment, and/or other information about how users interact with the content.

Tracking and analytic service 116 may apply machine learning, big data analytics, and/or other techniques to analyze data and provide insights to optimize content delivery services. For example, tracking and analytic service 116 may analyze the context of a webpage and mobile applications to determine whether or not to serve content in a given context. Even if a member of a cloud-based group visits a particular webpage or uses a mobile application, a contextual intelligence engine may determine that the content should not be served in a given context. For example, the website or mobile application may be associated with controversial subject matter, and the service may prevent the content from being served to protect brand safety of a content provider. The contextual intelligence engine may include one or more models that are trained using a machine learning algorithm to learn patterns of contexts where content is permitted to be served and contexts that are not permitted. Additionally or alternatively, tracking and analytic services 116 may provide other analytics, such as sentiment analysis to measure a cloud-based groups sentiment with respect to a particular set of content and estimated measures of the effectiveness of a campaign with respect to different cloud-based groups.

As noted above, the analytics may use machine learning to generate estimates or predictions given a set of data. A machine learning algorithm is an algorithm that can be iterated to learn a target model f that best maps a set of input variables to an output variable, using a set of training data. The training data includes datasets and associated labels. The datasets are associated with input variables for the target model f. The associated labels are associated with the output variable of the target model f. The training data may be updated based on, for example, feedback on the accuracy of the current target model f. Updated training data is fed back into the machine learning algorithm, which in turn updates the target model f.

In some embodiments, transaction service 118 manages digitized agreements and/or other transactions between cloud-based groups 102 and content service providers 122. For example, cloud-based groups 102 and content service providers 122 may enter into a digitized agreement that allows content service providers 122 to track content interactions for members of a cloud-based group. The digitized agreement may correspond to a smart contract, as described in further detail below. In other embodiments, the digitized agreement may be a digital contract or agreement recorded electronically that conforms to an agreement protocol, the format of which may vary from implementation to implementation. Transaction service 118 may register and enforce the digitized agreements.

In some embodiments, when transaction service 118 receives a new digitized agreement, transaction service 118 verifies the agreement (e.g., using digital signatures of the cloud-based group and content service provider). If successfully verified, then transaction service 118 may manage and enforce the agreement. For example, if the agreement allows a content service provider to collect information about group-level content interactions for a cloud-based group, then transaction service 118 may configure the other service of data cloud platform 112 to collect information for members of the cloud-based group and provide the information to the content service provider. Transaction service 118 may transfer digital tokens, coupons, payment, and/or other consideration from the content service provider to the cloud-based group based on the tracked content interactions based on the terms set forth in the digitized agreement. In other embodiments, the agreements may be enforced through members of a data cloud blockchain, as discussed in further detail below.

In some embodiments, query service 120 manages a registry of cloud-based groups and provides search functionality to identify groups that are of interest to a content provider. The registry may include cloud-based groups that have explicitly requested to be registered with data cloud platform 112. Additionally or alternatively, the registry may include cloud-based groups that were found by data cloud platform 112, such by crawling websites of the cloud services to identify the private groups.

Query service 120 may build a registry that includes entries for each registered group. Query service 120 may populate an entry for a group with information about the group. For example, the registry entry may include a group identifier that uniquely identifies the group, a cloud platform through which the group is formed, and group attributes identifying common characteristics of group members. Query service 120 may process queries submitted by content service providers 122 to identify groups that satisfy the query criteria.

Content service providers 122 may submit queries to data cloud platform 112 using search interface 124. For example, content service providers 122 may submit a request to identify groups that are dedicated to a particular topic and/or have other group attributes. In response, query service 120 may search the registry for groups matching the specified criteria.

The interfaces described herein, including search interface 124, may render user interface elements and receive input via user interface elements. Examples of interfaces include a graphical user interface (GUI), a command line interface (CLI), a haptic interface, and a voice command interface. Examples user interface elements include checkboxes, radio buttons, dropdown lists, list boxes, buttons, toggles, text fields, date and time selectors, command lines, sliders, pages, and forms. For instance, search interface 124 may include a text box for entering text specifying keywords, which may be matched to groups based on group names and/or other attributes. Additionally or alternatively, search interface 124 may present other user interface elements for specifying query criteria and/or filtering groups.

Transaction proposal interface 126 provides an interface through which content service providers 122 may submit proposed digitized agreements to cloud-based groups 102. For example, transaction proposal interface 126 may allow content service providers 122 to submit a request to collect anonymized group data for a group and specify the consideration for permitting access. The proposed consideration may be a flat rate, based on collected performance metrics, and/or subject to other conditions defined within the proposed digitized agreement. If the transaction proposal is accepted, then the terms and conditions defined in the digitized agreement may be enforce by transaction service 118, peer nodes within a blockchain network, and/or other system components.

Content editor 128 provides an interface through which content service providers 122 may create and/or submit content data 130 to serve via content delivery service 114. For example, content editor 128 may provide an interface for submitting images, videos, hyperlinks, and/or other multimedia content in a format that a webserver may use to render within client-side applications. Content service providers may upload content and any associated code into the data cloud platform. The data cloud platform may use one or more servers to monitor online interactions and serve the content, using the uploaded content and code, to a client-side application if the conditions for serving the content are satisfied, such as if a group identifier within an HTTP cookie is matched to a group identifier for a cloud-based group selected by the content service provider.

3. Member-Driven Policies and Protocols

In some embodiments, digitized agreements are subject to member-driven policies and protocols. If a proposed transaction/digitized agreement satisfies the member-driven policies and protocols, then the proposed agreement may be accepted and enforced within system 100. Otherwise, the agreement may be denied, in which case the content service provider is prevented from accessing the anonymized group data including tracking group-level content interactions.

In some embodiments, member-driven policies and protocols define a voting protocol for accepting proposals. For example, a voting protocol may be defined such that the proposal is accepted if a majority of group members vote to accept. As another example, the proposal may be accepted only if all members of the group accepted. In yet another example, members votes may be weighted differently and/or some members may not have voting rights, depending on the group policies. The proposal may be accepted if the weighted vote exceeds a threshold.

Additionally or alternatively, member-driven policies may define conditions for automatically accepting a proposal. For instance, a member-driven policy may be defined to reject proposals from external entities that are controversial or otherwise do not align with a group's objectives. As another example, a member-driven policy may accept proposals only if payment to access anonymized group data exceeds a threshold. The pre-conditions for accepting a proposal may be voted upon or otherwise set according to the group governance policies, rules, or heuristics. Thus, the policies and protocols may vary from group to group.

Member-driven policies and protocols may govern other aspects of a group. For example, the policies and protocols may define rules on who may join the group. Entities that do not satisfy a set of criteria may be prohibited from joining the private group. Additionally or alternatively, the members may vote on whether an individual may join a group. As another example, the policies and protocols may define how consideration received by the group is distributed among members of the group. The consideration may be distributed evenly, based on individual member contributions to the group, based on member seniority, or according to other rules/policies set by the group. As may be appreciated from the above examples, member-driven policies and protocols may provide a level of control and self-governing through which members may influence group-level operations.

Figure 2:
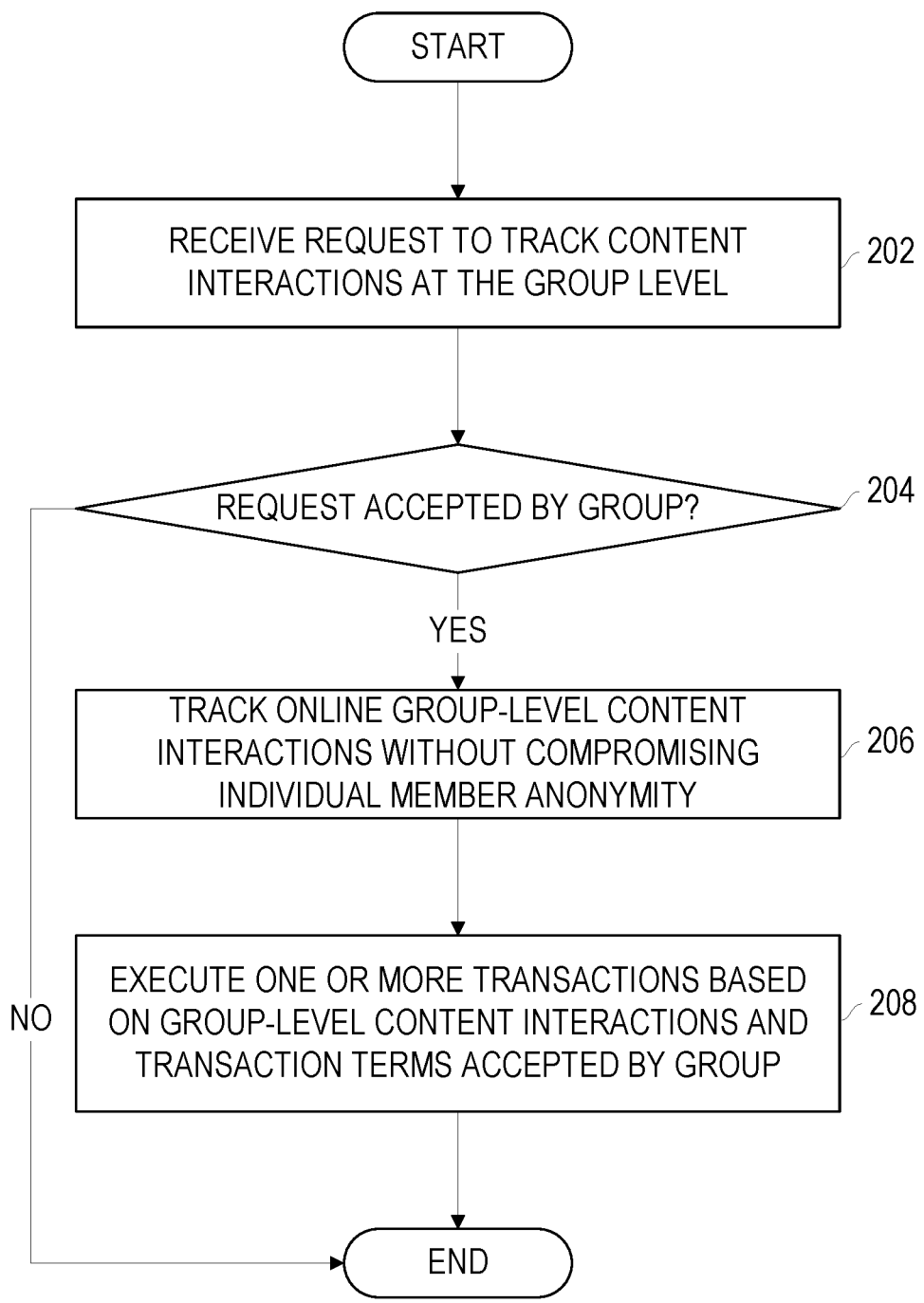
FIG. 2 illustrates an example set of operations for providing access to data associated with a group with content delivery service providers in accordance with some embodiments.

As previously mentioned, external entities, such as content service providers 122, may submit requests to engage with cloud-based groups 102. FIG. 2 illustrates an example set of operations for providing access to data associated with a group with content delivery service providers in accordance with some embodiments. One or more of the steps may be omitted, repeated, and/or performed in a different order. Accordingly, the specific arrangement of steps shown in FIG. 2 should not be construed as limiting the scope of the embodiments.

Data cloud platform 112 receives a request to track content interactions at the group level (operation 202). In some embodiments, the request may comprise a digitized agreement proposal for tracking the content interactions. The agreement may specify conditions for tracking the content interactions, such as a timeframe during which the interactions may be tracked, the websites where content interactions may be tracked, the group-level data that may be collected, and/or other terms of service. Additionally or alternatively, the digitized agreement proposal may specify consideration for accessing the data, as previously discussed.

In some embodiments, the transaction proposal is advertised to one or more cloud-based groups. The cloud-based groups may be selected on an individual group basis by the content service provider or the proposal may be advertised to all groups that satisfy a set of query criteria. For example, the proposal may be advertised only to groups with attributes matching those specified in a query. Once advertised, the groups may vote on the proposal according to group-specific voting protocols. The voting protocols may vary from group to group for the same advertised proposal based on the group governance model associated with the group. Additionally or alternatively, groups may established predefined rules, conditions, and/or heuristics for accepting advertised proposals as previously discussed.

Data cloud platform 112 determines whether the request is accepted by the group (operation 204). A cloud-based group may transmit the results of a vote or automated proposal analysis to data cloud platform 112. If the rejection is rejected, then the process ends, and the content service provider is prevented from collecting or tracking group-level data.

If the proposal is accepted, then data cloud platform 112 tracks online group-level content interactions without compromising individual member anonymity (operation 206). As part of the agreement, cloud-based service providers may provide a group identifier that may be used to track content-level interactions in an anonymized manner. Data cloud platform 112 may store the group identifier, monitoring traffic on one or more sites and comparing the group identifier to data collected by a server from HTTP cookies during content interactions to determine whether the identifiers match. If a match is detected, then data cloud platform 112 may update the group data. Data cloud platform 112 may further track the type of interactions, which may affect how the group data is updated. For example, if the user merely views the content, then data cloud platform 112 may increment the impression count value. If the user clicks on the content, then data cloud platform 112 may update the click-through rate. Additionally or alternatively, data cloud platform 112 may update average group ratings and/or sentiment based on how the group member reacts to the content.

Data cloud platform 112 executes one or more transactions based on the group-level content interactions and the transaction terms accepted by the group (operation 208). For example, data cloud platform 112 may execute one or more blockchain transactions as discussed further herein. Additionally or alternatively, data cloud platform 112 may execute other transactions to transfer consideration to a data-cloud group. The amount of consideration may be a fixed, predetermined amount or be variable based on terms set in the contract. For instance, the amount of consideration may be greater the higher the impression count, click-through rate, and/or other performance metrics.

The content-level interactions that are tracked may be used to provide insights to content service providers and other entities. For example, data cloud platform 112 may generate an engagement mapping of groups to content service providers. The engagement mapping may identify how various group attributes influence engagement with content provided by an advertiser or other entity. The mapping may highlight which group attributes were more positively correlated with a high-level of engagement and/or which attributes were most negatively correlated.

Data cloud platform 112 may use the insights to train and tune, using machine learning, a model that recommends or selects group segments for a set of content. For example, when a new set of content is created, a feature vector may be generated based on a set of features associated with the content, which may be extracted from the content data and/or metadata. The feature vector may be fed through the model, such as by performing a forward pass through a neural network model, to generate an output indicating a predicted effectiveness of the content with respect to various groups. Based on the model outputs, data cloud platform 112 may recommend or select one or more groups that have the highest predicted effectiveness scores. Content delivery service 114 may configure a server based on the recommended or selected group segment to render the content only to members of the selected group segment.

4. Group Opaqueness

When proposals are advertised to and accepted by a cloud-based group, various aspects of the group, including private member data 108, remain opaque to the external entity advertising the proposal. For example, individual member names, group handles, email addresses, and/or other personal identifying information (PII) are not provided to the external entities even when the agreement is accepted. The cookies generated by the cloud-based service may include only anonymized group identifiers so that the private data is not able to be linked to the group identifier. In other cases, data cloud platform 112 may be configured to collect only anonymized group identifiers from the cookie or the client-side application may be configured to allow cookies to only include anonymized group information.

While private member data 108 is opaque to external entities, the data may be accessible to other members of the same cloud-based group. For example, other members of the group may know individual member usernames, email addresses, SMS numbers, and/or other data. Such information may be provided to allow users to participate in the group but may be maintained private behind the authenticated cloud service to prevent non-members from gaining access.

Other aspects of the cloud-based group may also remain opaque to external entities. For example, the digitized agreement may not provide access to view internal group communications, how individual members voted on a proposal, how consideration is distributed to group members, and other private group operations. In some embodiments, the external entities are restricted to receiving an indication of whether a proposal was accepted or not and, if so, collecting anonymized group data 106 per the accepted digitized agreement.

In other embodiments, identifying information for one or more representative group members may be exposed to an external entity. Proposals and/or negotiations may be directed to a representative group member without compromising the anonymity of the other group members or the security of other private group data.

When tracking content interactions, system 100 maintains the anonymity of individual group members. However, individual group members may voluntarily reveal private information in some circumstances to an external entity. For example, an individual group member may click on an image or video with an embedded hyperlink that was created by a content service provider. The embedded hyperlink may direct the user to a website associated with content service provider. While on the website, the user may voluntarily submit personal identifying information to the content service provider, such as during an online transaction to purchase an item through the website. Until that point, the user's anonymity may be maintained, even while tracking the user's interactions online. Further, even though the user may voluntarily reveal the information, the other members of the group remain anonymous as private member data 108 is not exposed to external entities.

In some embodiments, system 100 includes one or more servers that operate on cookie data provided by browsers and/or other applications executing on client devices. As previously mentioned, HTTP cookies may be generated by a server while a user is visiting a website. The cookie may be stored on the visitor's computing device by the web browser or other client-side application used to access the website. Each HTTP cookie that is stored on the user's computer may include one or more blocks of data, which may include group-level information about the visitor and/or individual information about the visitor. For example, when a user logs into a cloud-based group, a server associated with the cloud-based group may store a cookie on the user's computing device that includes a hashed group identifier. The server may generate the hashed group identifier by applying a hash function to an identifier (e.g., group name, number, or other unique string of alphanumeric text) that uniquely identifies the group with respect to other groups that belong to the same cloud service. A server may store other group-level information within a cookie, such as interests associated with a cloud-based group (e.g., the group is dedicated to a particular topic, sport's team, etc.), group demographics (e.g., age distribution, gender distribution, education level, average income, etc.), group size, and/or group activity levels (e.g., average rate of new posts to the group, timestamp of last group post, etc.). Additionally or alternatively, a cookie may store individual information about a user, such as machine identifiers (e.g., hostname and IP address of the machine used to access a website), a user's email address, location information about the user (e.g., a city and zip code associated with the IP address used to access a website), and online behavior associated with the user (e.g., online purchases, sites most frequently visited, etc.)

When monitoring web traffic for a site, a server may extract a cookie stored on the visitor's computing device and search the group-level data from a matching group identifier and/or other group-level data. If a match is detected, then the server may serve the content to the client-side application such that the content is rendered within a webpage or application page that is visible to the user.

In some embodiments, the rendered content includes an embedded hyperlink that is selectable by the user. For example, the user may click on the rendered content using a mouse or select the content using a touchscreen, which activates the hyperlink to redirect the user to a new web or application page. The new page may be rendered within a new tab or window or may replace the page being currently viewed by the user when selected.

In some embodiments, when the user selects a page, system 100 treats the selection as an implicit acceptance to track and/or otherwise access individual information about the user. When the hyperlink is selected, the client-side application may be redirected to connect with the server that is under the control by the content service provider. Before selecting the hyperlink, the server is not connected to the client-side application and does not have the ability to collect any individual information about the user. However, when the user is redirected, the server associated with the activated hyperlink may collect cookie data from the user's computing device. In other cases, the server may prompt the user via the client-side application, such as presenting a pop-up window within a browser, before storing and/or accessing any cookie data to obtain explicit consent to access individual data. If the user rejects the prompt, then the server may serve the page without storing or accessing the cookie data.

If the user consents to allowing the server to access the cookie data, then the server may read one or more cookies stored on the user's machine. The cookies that are accessed may have been generated by one or more other servers based on other websites visited by the user. The cookie data that is accessed may reveal a machine ID, IP address, email address, and/or other key information about the user. The individual information may be mapped unambiguously or probabilistically to a pre-existing user profile of the member. An unambiguous match may be determined if information extracted from different cookies may clearly be mapped to the same user. For instance, information may include matching machine IDs, email addresses, IP addresses, etc. In other instances, a model may be used to estimate the probability if an unambiguous match is not detected. Partial matches (e.g., matching machine IDs) may raise the likelihood of a match although it may not guarantee that the visitor is the same user corresponding to a profile as different users may use the same machine or the machine information may not be available. If a pre-existing profile for the user does not exist, then the server may create a new profile for the user.

In some embodiments, the server of the site associated with the hyperlink or a server from another site may use key information extracted from cookie data to access information about other activities the member has performed online. For instance, the information may be used to determine what sites the user most frequently visits, online purchasing behavior, and cloud-based groups to which the user belongs. The server may use the information for targeted advertisements, messaging, service and/or user interface element rendering within the client-side application. For example, the site may show a product that the user has previously expressed interest in via a different site that is linked to the same key information but from a different cookie, stored in data cloud platform 112 in the same or probabilistically linked user profiles via different cookie managers provided by the platform.

Additionally or alternatively, data cloud platform 112 may host a virtualized browser in a virtual machine that issues request on behalf of a cloud-based group as a whole, through the virtual browser. For example, when the user activates the hyperlink, by clicking on or otherwise selecting the rendered content, an instance of the virtual browser may intercept the redirect and issue a request to associated server. Thus, the request may be issued from a machine that is provided by the data cloud platform rather than the individual user's machine. As a result, if the server attempts to access cookie data, it will not have access to cookies stored on the user's machine preserving the anonymity of the individual and the group. The virtual web browser may then act as an intermediary that serves the web site content to the member of the cloud-based group.

In the examples above, the individual membership data remains opaque to the content service provider before any interactions with served content occur. In particular, the individual data for a member of the cloud-based group, which may be stored in cookies, is not revealed or accessible to servers controlled by the content service provider before the user selects the content or otherwise activates the hyperlink. Responsive to the interaction, the individual information for the member that activated the hyperlink may become accessible. In other cases, additional safeguards may be put in place to protect the anonymity of the member, such as prompting the member whether or not to allow the server to access cookie data stored the user's machine or using a virtual browser executing on a virtual machine as previously discussed. Thus, the member's anonymity may be maintained even after interacting with the content until explicit consent is received or the user explicitly submits the information, such as through an online purchase. If the user does not explicitly give consent or submit personal information, then the member may continue browsing without revealing any individual data. However, in such scenarios, the content service provide may be granted access to the anonymized group level data that maintains the opaqueness of the group membership.

5. Integration Using Distributed Ledgers and Permissioned Blockchains

Techniques described herein may be implemented by one or more blockchain networks. A blockchain service refers to a network service, such as a platform-as-a-service (PaaS) or other cloud service, for maintaining blockchain-based distributed ledgers. A distributed ledger may include a set of blocks, linked through cryptographic values, that maintain a consensus of facts and the history of the ledger's updates. Distributed ledgers may be replicated, shared, and/or synchronized across multiple peer nodes within a blockchain network.

A blockchain allows entities (internal and external) that do not fully trust each other to agree on the updates submitted to a shared ledger by using peer-to-peer protocols rather than a centralized, third-party system that maintains the system independently. Each member of a blockchain may have a copy of the shared ledger, which includes a record of transactions that have occurred on the platform. The distributed ledger is not owned by one specific entity, and updates to the ledger may be blocked unless they conform with agreed upon peer-to-peer protocols. Further, cryptographic links between blocks of the ledger may render the records of transactions written to the ledger immutable and tamper-proof.

In some embodiments, the techniques described herein are implemented in a permissioned blockchain. A permissioned blockchain is one in which membership is restricted to a set of allowed participants. Permission may be granted by one or more founding members of a blockchain network or in accordance with a governance model. For example, if a group or institution wishes to join the permissioned blockchain, other institutional members may vote, or a board may decide whether to grant permission. As another example, permission for institutions may be restricted to those that have been accredited by a recognized accreditation agency. Other governance models may also be used, depending on the particular implementation. Permissioned blockchains are generally more efficient than public blockchains since the number of nodes on the platform may be limited and the rules within the blockchain network may be updated more quickly. Permissioned blockchains may further enhance the overall data quality by preventing entities from joining that are likely to provide inaccurate, false, stolen, or otherwise compromised data. However, one or more embodiments described herein may also be implemented within a public blockchain network.

In some embodiments, a data cloud blockchain includes various participants or members, which may have different roles as defined by a peer-to-peer protocol and/or enforced in smart contracts/chaincode deployed within the blockchain network. Example participants may include data provider member(s), data consumer member(s), content provider member(s), application platform member(s), data analytic member(s), and/or decentralized autonomous organization (DAO) members. A DAO member may include the cloud-based groups previously described. Details of each data transaction between blockchain members may be recorded on the shared ledger. The immutable and tamper-proof record may be used to identify and track which data sets were accessed, which source(s) provided the data, which consumer(s) accessed the data, which application platforms used the data, and in what campaigns/context the data was used. The above details may be stored without including data payloads from the data sets that were exchanged to prevent sensitive data from being stored in the shared ledger.

In some embodiments, the blockchain service generates and maintains accounts for members that have been granted permission to join the blockchain network. Member accounts may include credentials to access a cryptography-based, tamper resistant ledger. Members may initiate transaction proposals, which invoke smart contracts, to read from and/or write to shared ledgers subject to restrictions as described further herein.

In some embodiments, transactions between members on the blockchain are governed and/or executed by smart contracts, also referred to as chaincode. A smart contract is a program that runs within the blockchain and may be invoked to read and write application data from/to a shared ledger, apply validation logic to allow/deny a transaction, and/or trigger application events. For example, a data consumer may submit a proposed transaction to access data matching a specified set of criteria. In response, a set of nodes within the blockchain network may invoke one or more smart contracts to identify data sets matching the specified criteria, validate whether the consumer has satisfied requirements (predefined or determined at runtime) for accessing the data sets, and, if approved, commit the transaction record to the ledger. Smart contracts may be associated with a peer-to-peer endorsement and verification policies. If the requisite peers do not endorse or verify a transaction proposal, then the transaction may be aborted. An aborted transaction is not committed to the shared ledger.

Figure 3:
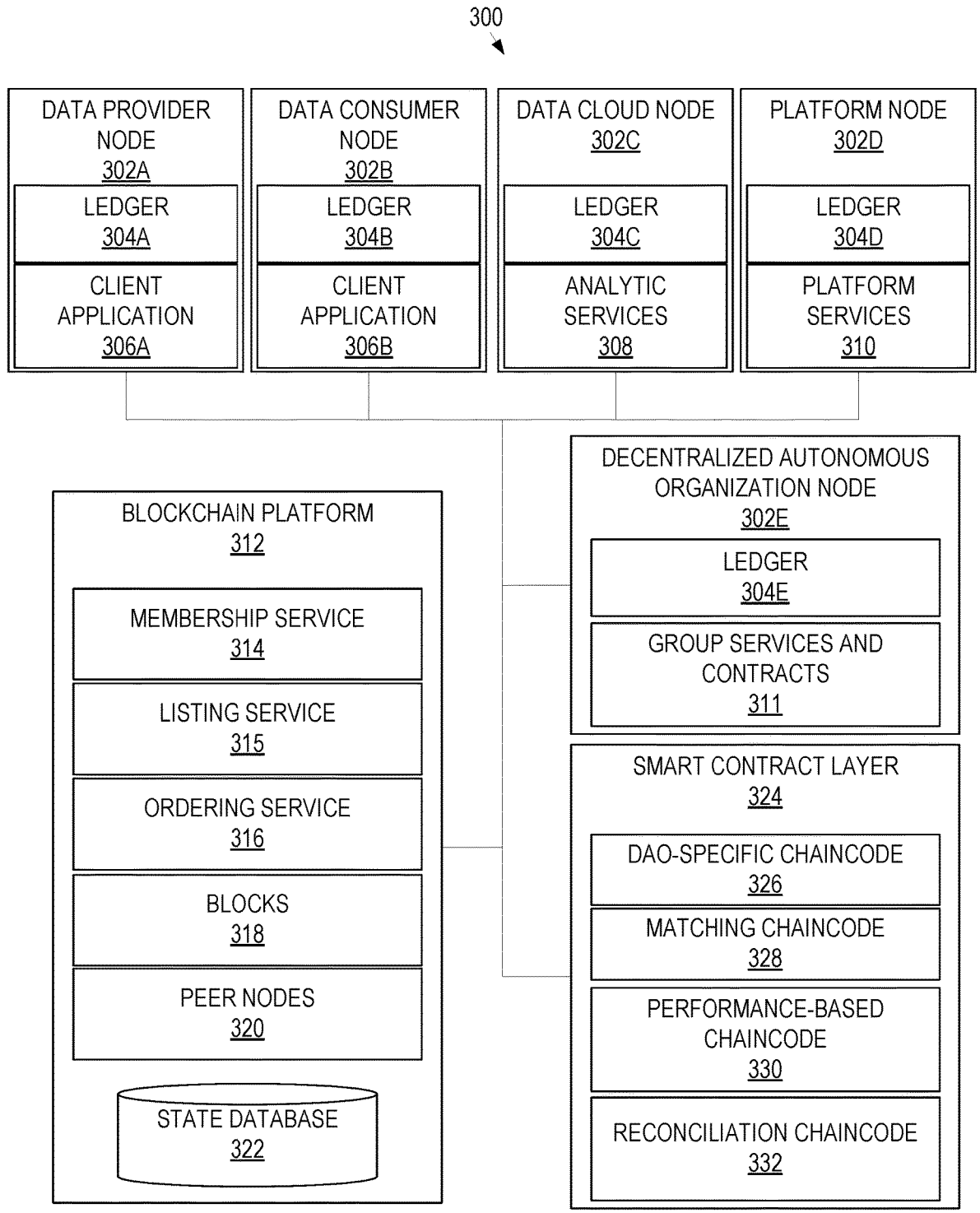
FIG. 3 illustrates an example data cloud blockchain system with support for decentralized groups in accordance with some embodiments.

FIG. 3 illustrates an example data cloud blockchain system with support for decentralized groups in accordance with some embodiments. As illustrated in FIG. 3, system 300 includes data provider node 302a, data consumer node 302b, data cloud node 302c, platform node 302d, decentralized autonomous organization (DAO) node 302e, blockchain platform 312, smart contract layer 324. In one or more embodiments, system 300 may include more or fewer components than the components illustrated in FIG. 3. The components illustrated in FIG. 3 may be local to or remote from each other. The components illustrated in FIG. 3 may be implemented in software and/or hardware. Each component may be distributed over multiple applications and/or machines. In some cases, multiple components may be combined into one application and/or machine. Operations described with respect to one component may instead be performed by another component.

Data provider node 302a is an operating network entity corresponding to a member of a blockchain that supplies data. Data provider node 302 stores a copy of a shared ledger (ledger copy 304a) and has a client application 306a for interfacing with the blockchain service. In some embodiments, client application 306a invokes a set of application programming interfaces (APIs) and or software development kits (SDKs) to interact with chaincode and consume events. For example, client application 306a may invoke chaincode to specify what data sets are available to share, conditions for accessing the data set, and restrictions on when/where the data may be used.

Data consumer node 302b also stores a copy of the ledger (ledger copy 304b) and includes client application 306b for interfacing with the blockchain service. In some embodiments, the chaincode that may be invoked through client application 306b is tailored to the role of a data consumer and different than the chaincode that is accessible through client application 306a. For example, data consumers and providers may be restricted to initiating different types of transactions within the blockchain. Restrictions may be enforced based on membership credentials, such as a public-private key pairing. In other embodiments, a member node may be permitted act as both a data provider and data consumer within the blockchain. In this case, the member node may be permitted to use the same credentials to initiate transaction proposals for both supplying and consuming data.

Data cloud node 302c stores a copy of the shared ledger (ledger copy 304c). Data cloud node 302c further provides analytic services 308, which may run analytics on already consumed and/or to-be-consumed data sets. In some embodiments, analytic services 308 may invoke smart contracts to read and/or write performance metrics to the distributed ledger.

Platform node 302d stores a copy of the shared ledger (ledger copy 304d) and further provides platform services 310. In some embodiments, platform services 310 include campaign delivery platform services. For example, platform services may include logic for inserting campaign messages within one or more pages of a website. Platform services may format the campaign messages (e.g., via HTML, cascading style sheets, etc.) to conform to the look and feel of a webpage. As another example, platform services may provide an application, such as a forecasting tool, baselining tool, anomaly detection tool, or other data analytics tool that consumes data to provide an automated analytic output. The analytic output may trigger one or more automated actions and/or be consumed by other applications within the blockchain which may also apply further analytics and/or trigger application-specific actions.

DAO nodes 302e stores a copy of the shared ledger (ledger copy 304e) and further provides group services and contracts 311. In some embodiments, group services and contracts 311 provides:

Interfaces for creating a DAO nodes;

Organization templates for structuring a DAO;

Smart contract templates for defining smart contracts between members of the DAO and/or smart contracts between the DAO and non-members (e.g., other members of the data cloud blockchain network that do not belong to the DAO);

Application programming interfaces (APIs) and/or smart contracts for voting;

Token creation, distribution, and management services; and/or

APIs and/or smart contracts for reconciliation and/or other transactions with the data cloud blockchain network.

In some embodiments, a blockchain member may belong to one or more blockchain channels. A channel in this context refers to a subnet within a blockchain network with an isolated ledger and an authorized group of blockchain members/nodes. Transactions executed on a specific channel may be restricted to accessing the ledger on that channel, however a member that belongs to different channels may execute independent transaction on each channel. Thus, although only one ledger is depicted per node, a blockchain node may store copies of multiple ledgers (e.g., one per channel to which the node belongs). Further, the number and types of blockchain nodes may vary depending on the particular implementation.

Blockchain platform 312 comprises a set of nodes and services for managing distributed ledgers. Blockchain platform may generally comprise membership service 314, listing service 315, ordering service 316, blocks 318, peer nodes 320, and state database 322. Blockchain platform 312 may provide a closed ecosystem where only invited entities (e.g., cloud-based group, content service providers) can join the permissioned blockchain network (and/or subnets/channels thereof) and keep a copy of a distributed ledger.

Membership service 314 is configured to manage roles and access policies for members of the blockchain network according to some embodiments. For example, membership service 314 may handle adding, verifying, and canceling membership within the blockchain network. As another example, membership service 314 may define access policies for different user roles. For instance, membership service 314 ay assign members to different blockchain channels, where each blockchain channel maintains an isolated distributed ledger for a corresponding subset of members of the overall blockchain. A member may be granted cryptographic keys to access the corresponding ledger and/or smart contracts that have been deployed to the blockchain channel.

In some embodiments, membership services 314 may define and enforce different access policies for founding members and participant members. For example, founding members may determine which participant members are able to join the blockchain network. When a new member is added, a digital certificate may be generated to confirm the identity of the member within the blockchain network. Founding members may be comprised of a subset of members on the blockchain network or may be third-party members that do not participate in transactions on the blockchain network.

In some embodiments, membership services 314 manages the creation and/or registrations of DAOs within the data cloud blockchain network. Membership services 314 may provide an interface through which DAOs may request to join the blockchain network, undergo verification/authentication procedures, and/or register as members of the blockchain network. Membership services 314 may define and/or enforce criteria for joining the data cloud blockchain network. Membership services 314 may reject registration requests and/or otherwise prevent DAOs that do not satisfy the set of criteria from joining a permissioned blockchain network. For DAOs that satisfy the set of criteria and are properly authenticated, membership services 314 may establish a new node within the data cloud blockchain to grant access to the DAO to access/update/generate distributed ledgers, smart contracts, blockchain transactions, and/or other blockchain services.

Listing service 315 generates a searchable registry of DAOs that are part of the data cloud blockchain network. As new DAOs join the data blockchain network, listing service 315 updates the registry with information about the new DAO, such as a DAO name, unique identifier, group description, and/or other group attributes. DAOs that leave the data blockchain network may be removed from the registry.

Ordering service 316 is a set of one or more nodes for creating new blocks from transactions sent by members of the blockchain network. Ordering service 316 may include a single ordering process or a cluster of processes. Ordering service 316 may validate proposed transactions and sequence the transaction into blocks.

Blocks 318 are data objects used to store a consensus of facts for a shared ledger. Blocks may be added to the chain when updates occur, such as when a member writes new data (e.g., a record of a transaction between a data consumer and data provider) to the ledger. Each block within a blockchain includes a cryptographic hash of the previous block that links the blocks together. A block may further comprise a timestamp indicating when the block was generated, the current state of the ledger, and/or transaction data identifying the transactions (e.g., write operations) that resulted in the current state of the ledger. The cryptographic link between blocks in a blockchain enhance the tamper-proof nature of a shared ledger. Altering the data within one block may require re-computation of the cryptographic hash value for each of the subsequent blocks in the chain. A consensus protocol among the peer nodes may prevent such tampering.

Peer nodes 320 are operating entities on the blockchain network that are responsible for maintaining a copy of the ledger, running smart contracts, and committing transactions. Peer nodes 320 may include one or more of data provider node 302a, data consumer node 302b, data cloud node 302c, and platform node 302d. A blockchain member may have one or more peer nodes on the blockchain network.

In some embodiments, a peer node is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

State database 322 tracks the current state of one or more distributed ledgers. State database 322 may be used to detect peers that are offline and update blocks to peers that are out of sync. In some embodiments, the state includes state information about data being exchanged through the blockchain. For example, the state may include, but is not limited to, one or more of the following attributes:

Data bought: Indicates whether the data has been purchased by another member of the blockchain network;
Data used: Indicates whether the data has been used by another member of the blockchain network, such as in an online campaign by campaign management software;
Campaign messages seen: Indicates whether an online campaign message that used the data was viewed, clicked on, or otherwise seen via a client application, such as a web browser;
Content interaction statistics: Captures impressions and/or other statistics related to interactions between group members using a client application and content served to the client application;
Identity used in x context: Identifies the context in which the data was used;
Consent state over a period of time: Tracks the consent of an individual user or DAO, which may change over a period of time or vary based on the kind of supplier and marketer using the data; and
Audit state: Tracks the state of an audit of transactions associated with the data.

It is noted that the above attributes may be tracked within the state database and/or distributed ledgers without storing the data payloads that are exchanged between different blockchain members. Thus, an immutable and tamper-proof record of how and when data is used may be created without compromising the privacy of the data.

Smart contract layer 324 includes blockchain programs that may be invoked by blockchain nodes to read and write application data from/to a ledger, apply validation logic and/or trigger application events. A chaincode may be installed/instantiated on one or more blockchain channels. However, the same chaincode may be run in different contexts that are specific to a channel. For example, the required endorsements to executed a smart contract may vary from one blockchain channel to another.

A blockchain may include various smart contracts that define transaction logic for different types of transactions. In some embodiments, the blockchain programs define transactional logic for various types of transactions including:

DAO-specific chaincode 326 registered for a particular DAO for executing DAO-specific blockchain transactions within the data cloud blockchain network;
Matching chaincode 328 for matching available data sets and/or DAO nodes with criteria;
Performance-based chaincode 330 for executing blockchain transactions based on performance metrics associated with usage of a dataset made available by a DAO;
Reconciliation chaincode 332 for reconciling transactions within the blockchain.

Additionally or alternatively, smart contract layer 324 may include other blockchain programs including:

Option-based chaincode for handling options placed on data sets made available by a DAO or data provider node;
Deletion chaincode for handling request to delete sensitive information or opt-out of information sharing;
Impression chaincode for reconciling transactions based on measured impression metrics for data sets;
State change chaincode for updating and/or otherwise modifying data within state database 322;
Payment chaincode for processing payments for data access within the blockchain;
Revenue chaincode for tracking revenue from data usage and initiating revenue-based transactions within the blockchain.

Example smart contract functions are described in further detail in the sections below.

Additional embodiments and/or examples relating to computer networks are described below in Section 11, titled "Computer Networks and Cloud Networks."

6. Ledger Transaction Management

As previously mentioned, peer nodes may be configured to manage transactions within a blockchain, including reads and writes to shared ledgers. For example, peer nodes may endorse, validate, order and/or commit transaction records that satisfy prescribed policies. Transaction records may be used restrict and track exchanges of data between blockchain members.

Figure 4:
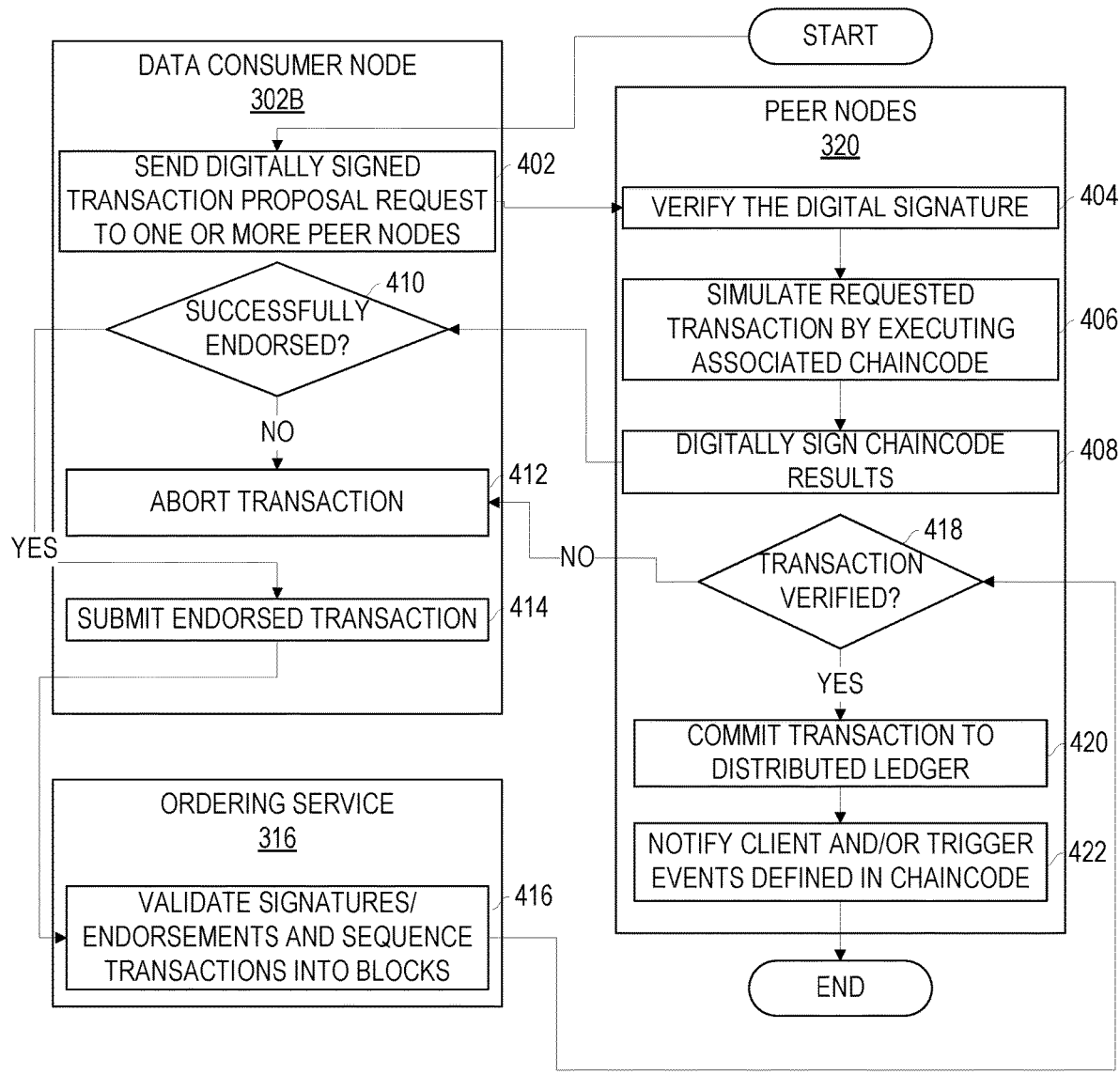
FIG. 4 illustrates an example set of operations for managing a transaction flow within a blockchain network in accordance with some embodiments.

FIG. 4 illustrates an example set of operations for managing a transaction flow within a blockchain network in accordance with some embodiments. One or more of the steps may be omitted, repeated, and/or performed in a different order. Accordingly, the specific arrangement of steps shown in FIG. 4 should not be construed as limiting the scope of the embodiments.

The transaction flow includes sending, by data consumer node 302b a digitally signed transaction proposal request to one or more peer nodes (operation 402). Although a data consumer node initiates the request in the present example, other blockchain members may initiate transaction, depending on the particular implementation. Further, the types of transactions that may be initiated on the blockchain may vary depending on the member role (e.g., consumer-initiated transactions, provider-initiated transactions, platform-initiated transactions, etc.).

One or more of peer nodes 320 receives the transaction proposal and verifies the digital signature (operation 404). In some embodiments, a digital signature is verified using a public-private key pairing. For instance, data consumer node 302b may provide peer nodes 320 that are part of the same blockchain channel with public keys. Data consumer node 302 may use the private key to digitally sign the request, which may be verified by the peer nodes 320 using the provided public key.

Once verified, the one or more peer nodes simulate the requested transaction by executing the requested chaincode (operation 406). In some embodiments, simulating the transaction includes generating a chaincode results (e.g., a read-write set for a distributed ledger). The result is not committed to the ledger at this time.

The one or more peer nodes next digitally sign the chaincode results and return the results to data consumer node 302b (operation 408). Each peer node may use a private key to digitally sign the chaincode results.

Data consumer node 302b receives the results from the one or more endorsing peer nodes and determines whether the proposed transaction was successfully endorsed (operation 410). In some embodiments, this operation includes verifying the signatures of each endorsing peer, checking to see if the results from different peers match, and verifying the endorsement policy requirements established for the chaincode (or chaincode channel) have been satisfied.

If the transaction was not successfully endorsed (e.g., the endorsement policy requirements were not met), then the transaction is aborted (operation 412).

Otherwise, data consumer node 302b submits the endorsed transaction to ordering service 316 to proceed with committing the proposed transaction (operation 414). In some embodiments, the submitted transaction includes the results (e.g., the read-write sets) and signatures from each endorsing peer.

Ordering service 316 validates the signatures/endorsements submitted by data consumer node 302b and sequences the submitted transactions into blocks (operation 416). The manner in which blocks are ordered may vary from implementation to implementation (e.g., ordering may be based on timestamps, byzantine fault tolerance, etc.).

The ordering service next submits the new blocks to one or more of peer nodes 320 to commit the transaction (operation 418). The committing peers may be the same or a different set of peer nodes than the endorsing peers.

The committing peers determine whether the transaction is verified (operation 420). In some embodiments, each committing peer validates the signatures, determines whether the endorsement policy is satisfied, and compares the values of keys/variables read at endorsement time with the current values for changes.

If the transaction cannot be verified (e.g., invalid signature, endorsement, or change in key values), then the transaction is aborted (operation 412).

Otherwise, the transaction is committed to the distributed ledger (operation 422). The updated ledger may be replicated across all members of the blockchain channel. It is noted that invalid/aborted transactions may still be written to a ledger; however a commit flag for the transaction may be used to indicate that the transaction committed or failed.

7. Decentralized Group Creation and Registration With The Data Cloud Blockchain Decentralized autonomous organizations (DAOs) and/or other cloud-based groups may register and join a data cloud blockchain according to some embodiments. DAOs provide for decentralization in the sense that the groups are not bound by the structure or hierarchy of other organizations within the blockchain network including other DAOs and institutional members. DAOs may be run by way of decentralized control structures and voting, which may vary between different DAOs nodes. DAOs may control which individuals are eligible to join the DAO, the smart contracts/blockchain that govern the DAO, the voting protocol through which changes to the DAO are approved, and/or other parameters that control how the DAO is run and operates within the data cloud blockchain.

A DAO may be associated with a sidechain, which is a separate blockchain that runs independently of the data cloud blockchain. For instance, a sidechain may have separate consensus protocols (including voting protocols), distributed ledgers, and blockchain parameters. A sidechain may be connected to the data cloud blockchain for transferring digital assets between the different blockchain networks. The data cloud blockchain may be referred to as the "main" or "parent" blockchain. Transferring mechanisms and protocols, such as a two-way peg, may be used to allow for the interchange of assets between the main blockchain network and sidechain networks that have been connected or "pegged" to the data cloud blockchain. DAOs that are successfully registered with the data cloud blockchain during a registration process may be pegged to the main blockchain network during.

Figure 5:
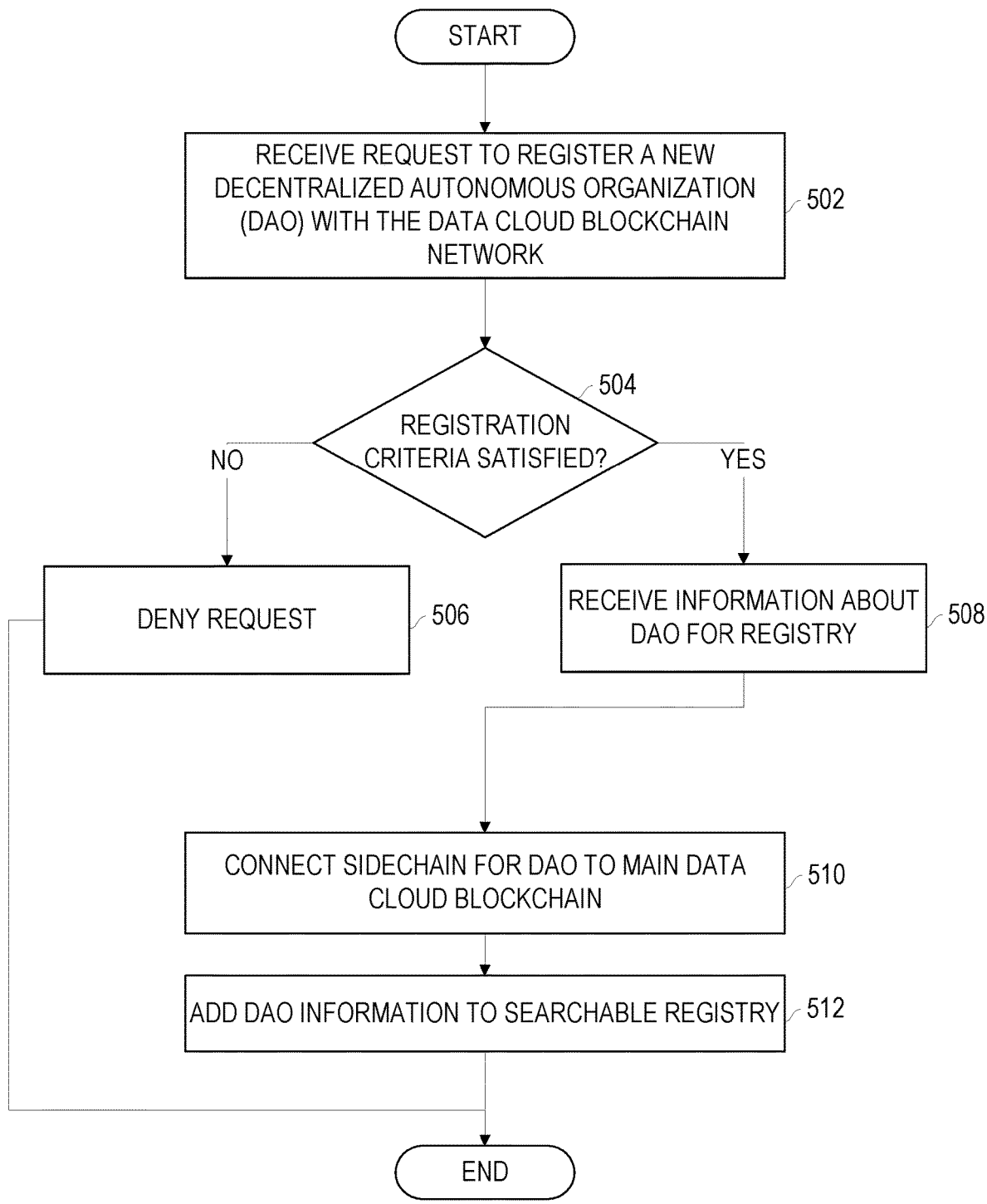
FIG. 5 illustrates an example set of operations for registering decentralized groups with a blockchain network in accordance with some embodiments.

FIG. 5 illustrates an example set of operations for registering decentralized groups with a blockchain network in accordance with some embodiments. One or more of the steps may be omitted, repeated, and/or performed in a different order. Accordingly, the specific arrangement of steps shown in FIG. 5 should not be construed as limiting the scope of the embodiments.

Referring to FIG. 5, the process includes receiving a request to register a new DAO with the data cloud blockchain network (operation 502). The request may be processed according to a consensus protocol established by the main blockchain network. The consensus protocol may dictate rules and conditions (registration criteria) under which registration requests are accepted or rejected.

Responsive to receiving the request, the process determines whether the registration criteria have been satisfied to register the DAO with the blockchain network (operation 504). As previously noted the registration criteria may include rules and conditions for registering, which may be defined by a consensus protocol associated with the main data cloud blockchain. In some cases, the initiator of the request may be prompted to input additional information to determine whether the registration criteria is satisfied and/or to authenticate the group. Additionally or alternatively, the addition of a new DAO may require a threshold number of existing members (or threshold number of members with a particular role such as institutional members) to vote to approve the new DAO or to endorse the DAO before it is registered.

If the registration parameters/criteria that have been set are not satisfied, then the request may be denied (operation 506). As a result, the DAO may be barred from accessing and being connected/pegged to the main data cloud blockchain network. Subsequent requests may be blocked or ignored.

If the registration criteria is satisfied, then the process receives/extracts information about the DAO for the registry (operation 508). The information may include a name for the DAO, a description about the DAO (e.g., a description about the purpose or membership of the group), statistics about the DAO (e.g., total number of current members, average/median age of the group, average income of the group, geographic span of the group, etc.), and/or a description about the data made available by the group (e.g., what type of data is made accessible by the DAO, such as location data, purchasing behavior, preferences, browsing behavior, etc.) Additionally or alternatively, the process may receive smart contracts and/or blockchain parameters associated with the DAO, such as chaincode for accessing data from the DAO and chaincode for reconciling transactions with the DAO.

In some embodiments, the process adds the DAO information to a searchable registry (operation 510). For example, the registry may store the DAO name and/or other unique identifier, a description of the DAO, statistics about the DAO members, and/or a description of the type of datasets/smart contracts made available by the DAO. The registry may be queried, as described further below, to search for DAO groups, datasets, and/or smart contracts that satisfy a set of query criteria.

In some embodiments, the process connects a sidechain for the DAO to the main data cloud blockchain (operation 512). The connection mechanism may establish a two way peg or entangle the sidechain with the main blockchain network. Additionally or alternatively, other connections mechanisms may be implemented to interface the two blockchain networks.

As previously mentioned, the organization and structure of DAOs may vary. A group of individuals may establish new DAOs and restrict membership in the DAO based on a set of criteria. For example, a DAO may be limited to individuals that live within a threshold distance of a particular location, that are older/younger than a threshold age, that are alumni of a particular educational institution, that are current members of a particular group/organization, etc. In other cases, a DAO may be open to any interested party. Thus, the criteria for restricting which individuals or entities may join a DAO may vary from one group to the next.

Additionally or alternatively, DAOs may vary in other regards. For instance, DAOs may specify caps that limit the total number of members that may join, define different voting protocols (e.g., majority wins, weighted voting based on seniority in the group, etc.), and define different smart contracts/blockchains that govern/enforce rules of the sidechain network.

In some embodiments, institutions that are members of the blockchain may establish new DAO nodes that may be connected to the blockchain. The institutions may provided incentives or prompt individuals to join a DAO based on online behavior, attributes, and/or other parameters. For example, an institution may prompt all users that clicked on a particular hyperlink, left a positive impression on a social media site, or exhibited other common online behavior to join a particular DAO. The prompt may be displayed via a webpage, application page, or other GUI interface. The prompt may include a hyperlink and/or other interface that, when selected, registers the user as a member of the DAO. The prompt may include information about voting rights, incentives (e.g., payments for data sharing/pooling), and/or other data about the DAO. As another example, the institution may prompt former, current, and/or prospective customers to join an existing DAO (or create a new DAO) to receive tokens or loyalty points through the DAO.

Users that join a DAO may opt out of the DAO at any time. DAOs may also be removed from the registry/data cloud blockchain if the DAO votes to leave the blockchain network (in accordance with the sidechain voting protocol). In other cases, other members of the main blockchain may vote to expel a DAO (in accordance with the main blockchain voting protocol).

DAOs may define different roles for members of the DAO and associated sidechain. For example, an escrow account may be a role that receives cryptocurrency and/or other tokens from members of the main data cloud blockchain. The cryptocurrency and/or tokens in the escrow account may then be distributed to other members of the DAO based on the DAO smart contracts/chaincode/sidechain programs. As another example, founding members of a DAO may have more highly weighted voting rights than non-founding members. Additionally or alternatively, a DAO may define other roles, which may vary between different DAOs.

In some embodiments, the data cloud blockchain may provide interfaces, organizational templates, smart contract templates, voting APIs/chaincode templates to facilitate creation of a DAO on the data cloud's blockchain network, and APIs/chaincode templates for reconciliation with the network for payment and incentive. For example, a user may browse different organizational templates, which may define different possible structures and voting protocols for a DAO. The user may select and template, populate the template with custom information (e.g., DAO name, description, etc.), and/or customize one or more aspects of the template (e.g., voting logic, block parameters, etc.).

8. DAO and Data Matching Blockchain Transactions

In some embodiments, listing service 315 provides a searchable directory of registered/available DAOs. Members of the data cloud blockchain network, such as data provider node 302a, may search the registry to identify DAOs and/or data sets that match a set of search criteria. The listing service allows blockchain members to bid on or otherwise enter into smart contracts for data sets made available through decentralized groups. Blockchain members may search for data sets and DAO groups of interest, and execute one or more smart contracts with the DAO node to access data. DAO groups may vote to accept or reject proposed smart contracts/bids based on DAO-specific voting protocols. Additionally or alternatively, DAOs may define preexisting smart contracts that specify conditions for accessing data made available by the DAO node. Other blockchain members may analyze and execute the preexisting smart contracts upon identifying DAOs and corresponding datasets of interest.

Figure 6:
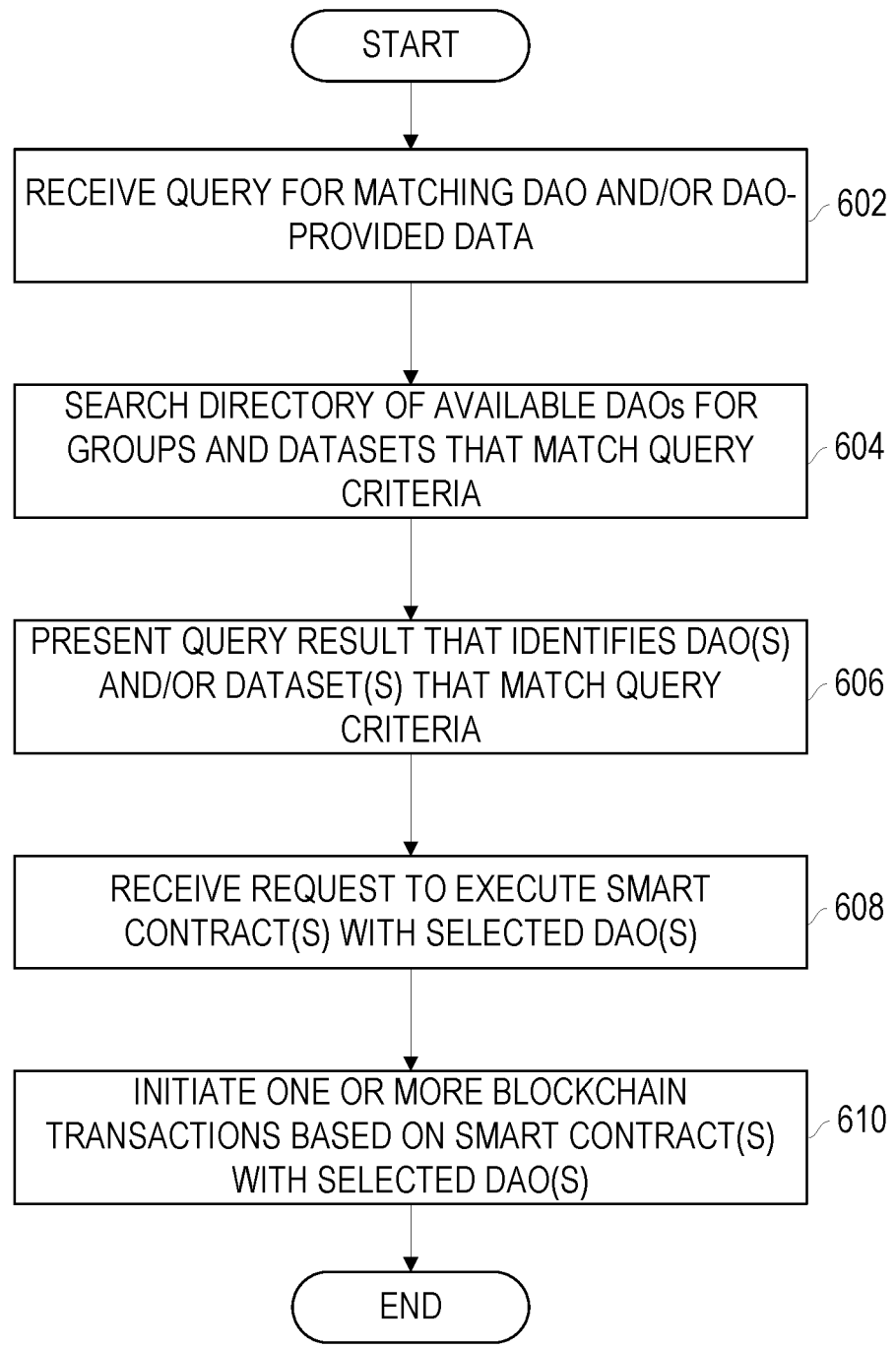
FIG. 6 illustrates an example set of operations for searching for datasets provided by decentralized groups and executing blockchain transactions in accordance with some embodiments.

FIG. 6 illustrates an example set of operations for searching for datasets provided by decentralized groups and executing blockchain transactions in accordance with some embodiments. One or more of the steps may be omitted, repeated, and/or performed in a different order. Accordingly, the specific arrangement of steps shown in FIG. 6 should not be construed as limiting the scope of the embodiments.

Referring to FIG. 6, a member of the data cloud blockchain network submits a query to search for DAOs matching a set of criteria (operation 602). For example, data provider node 302 may search the registry for DAOs where the average member is within a certain age range, live within a particular geographic location, are alumni of a particular institution, have attended particular sporting events, have more than a threshold number of members, or satisfy some other set of criteria.

Responsive to receiving the query, the process searches the directory of available DAOs for groups and datasets that match the query criteria (operation 604). The process may use keyword matching and/or other algorithms to search the directory/registry data. For example, the process may scan, parse, tokenize, and analyze DAO descriptions, attributes, group statistics, and/or other DAO data for matches.

In some embodiments, the process presents a query result that identifies one or more DAOs and/or one or more associated datasets that match the query criteria (operation 606). For instance, the query result may include a list of DAOs, which may be rank ordered based on a strength measure/estimate for the match, which may be based on number of keyword matches, filters, and/or other ranking criteria. The DAOs may be presented on a webpage or other GUI to allow the requesting entity to quickly view and scroll the available DAOs. The GUI may further display or allow a user to drill down on the results to view more information about a DAO, such as the kind of data made available by the DAO (such as intent, demographic data, etc.), payment methods/price to access the data sets, composition of the DAO (e.g., age, demographics, etc.), performance of the dataset for similar data consumers (e.g., impressions, click-through rates, cost per mille, conversion rates, etc.).

In some embodiments, the process receives a request to execute one or more smart contracts with one or more of the DAO nodes identified by the search results (operation 608). In some embodiments, the smart contracts may be preexisting, defining terms and conditions for accessing a DAOs data set. Additionally or alternatively, a data consumer may bid on the data sets and propose a new smart contract. The blockchain network (main or sidechain) may send a notification to the DAO members of the new smart contract. The members may vote to accept or reject the smart contract. The result may be determined based on the DAO's voting protocol/rules. Access may then be granted or denied to the requesting node based on the result of the vote.

The peer nodes next initiates one or more blockchain transactions based on the one or more smart contracts (operation 610). For example, the transaction flow depicted in FIG. 2 may be implemented based on the invoked smart contract and associated endorsement policies to determine whether the transaction should be committed. In the event that the transaction fails or cannot be verified, then the transaction may be aborted. As previously noted, a failed transaction is not committed to the blockchain, but may still have its details written with a flag indicating that it failed. If the transaction is successfully endorsed and verified, then the peer nodes commit the transaction to the shared ledger, which is distributed/replicated to the members of the blockchain channel. The shared ledger may include various details about the data that was exchanged. For example, the shared ledger may reflect the identify of the DAO and data consumer node, conditions associated with accessing/using the dataset (if any), a time limit associated with accessing the dataset (if any), and/or other transaction details. As described further below, the distributed ledger may be updated with data usage metrics periodically or responsive to certain events triggering additional blockchain transactions. The transaction details (including performance metrics, if any) that belong to a same block may be hashed. The hash may be stored in the subsequent block to provide a cryptographic link between the different blocks written to the ledger.

The smart contract may further trigger exchange of data between the data provider(s) and consumer and/or platform nodes. For example, the data may be provided from a DAO node to a campaign delivery platform. The data may include hashed identifiers, such as cryptographic hashes of emails, web cookie identifiers, and/or other information associated with members of the DAO. The campaign delivery platform may then monitor, through embedded script tags, webpage accesses for visitors that match the hashed identifier for a user. The use of hashed identifiers allows for the data to be anonymized. The data consumer node may be prevented from directly accessing the hashed identifiers to protect the data and data privacy of the users. Thus, usage may be restricted to the campaign deliver platform, which may then customize/render the webpage in a manner that is tailored for the identified user.

Additionally or alternatively, other types of data may be provided to platform node, data consumer node, and/or other nodes within the blockchain network responsive to executing a smart contract. For example, anonymized group behavioral data may be provided to a node, such as what percentage of DAO members have a positive impression of a sports team, what percentage have purchased an electric car in the last three years, etc. The information may be consumed by a platform node and/or application to tailor online campaigns, generate automated social media posts, train machine learning models and/or perform other application-specific functions. As another example, the provided data may be used to identify information about visitors of a DAO that are accessing a webpage to customize the web page in a manner that is determined to most likely be relevant to the user. The content, visual elements, and manner in which the webpage is rendered may thus vary from one user to the next. In yet another example, a machine-learning (ML) service may rely on quality training data to train and accurate model. The entity wishing to train the machine-learning service may not have access to quality data. The raw data may be acquired through DAOs on the blockchain network may be transformed by a ML application for use in training and evaluating ML models.

If access is time-constrained, then, the ledger may be updated (e.g., a new transaction may be initiated) and access to the data set may be terminated. In some embodiments, the data sets (e.g., hashed user ids, etc.) may be provided directly to the platform members rather than the data buyers. This may allow platforms to execute functions on the data sets without revealing the data sets to the data buyer. In other cases, the data buyer may still have access to the data at the time it existed before access has been cutoff. A data set may continuously/periodically evolve, which reduces the quality of an older data set over time.

Smart contracts may define transaction logic for handling exchanges of data between members of the blockchain, including DAOs. For example, a smart contract may define the conditions/criteria under which a data set is exchanged. DAOs may vote on the define and change the conditions for accessing data, and the data to make available on the main data cloud blockchain. Example conditions, may include:

- Required consideration to access the data set available through a DAO (e.g., a purchase price/remittance, an acceptable trade of information, consent and data usage rights, etc.);
- Restrictions on how long the data set may be accessed (e.g., the data set may be accessed for a specified window of time or until a particular date); and
- Restrictions on how the data set may be used (e.g., the data set may only be used on certain applications/platforms nodes in the blockchain).

9. Reconciliation and Sidechain Smart Contracts

In some embodiments, data consumers may provide compensation and/or other forms consideration to DAOs for usage of a dataset. Consideration, such as cryptocurrency, tokens, loyalty points, and/or other digital blockchain assets, may be provided up front to access the dataset. Additionally or alternatively, consideration may be contingent and/or vary based on the performance of a dataset. For instance, the amount of consideration may increase the higher the performance metrics (e.g., the greater number of click-throughs, positive impressions, etc.). As another example, consideration may be contingent upon the data reaching certain performance thresholds, which may vary depending on the particular application consuming the data.

In some embodiments, reconciliation transactions include multiple layers of smart contracts/chaincode. At the topmost layer, the data cloud blockchain may execute reconciliation transactions, as defined through one or more associated smart contracts, to transfer assets to a DAO node, such as a DAO escrow account. The sidechain associated with the DAO may define one or more smart contracts to reconcile payments to the escrow account with individual members of the DAO. (An individual member of a DAO may be an individual person/entity or another DAO. In the latter case, the DAO may be associated with another sidechain the is pegged to the DAO's sidechain with its own smart contracts and distributed ledgers. Thus, the hierarchy may run multiple levels/layers deep from the parent data cloud blockchain network).

Smart contracts may implement arbitrary logic to reconcile transactions. Further, the logic may vary between the main blockchain network and different DAO sidechain networks. For example, a blockchain program on the main data cloud blockchain may initiate a reconciliation transaction to distribute assets to one or more DAOs based on performance metrics extracted by analytic services 308 and/or platform services 310. A second smart contract executing in the sidechain may then distribute assets (e.g., sidechain tokens, cryptocurrency, loyalty points, etc.) based on contributions of the various members, seniority, and/or other attributes particular to the DAO. The distribution protocol may be voted and agreed upon by members of the DAO. In other cases, the distribution protocol may be established by the founding members of a DAO.

When a peer node is running a smart contract, the peer node may read performance metrics for a data set from the distributed ledger. The performance metrics may affect the runtime behavior of the smart contract. For example, the smart contract may execute a transaction on a data set only if the performance metrics are above a threshold or may match the highest performing data set in a particular category. As another example, a data set may be dynamically priced based on its performance metrics—the consideration required to access the data set may be continuously or periodically adjusted. The price for a data set may increase as a function of higher performance metrics or decrease as performance metrics decline.

Figure 7:
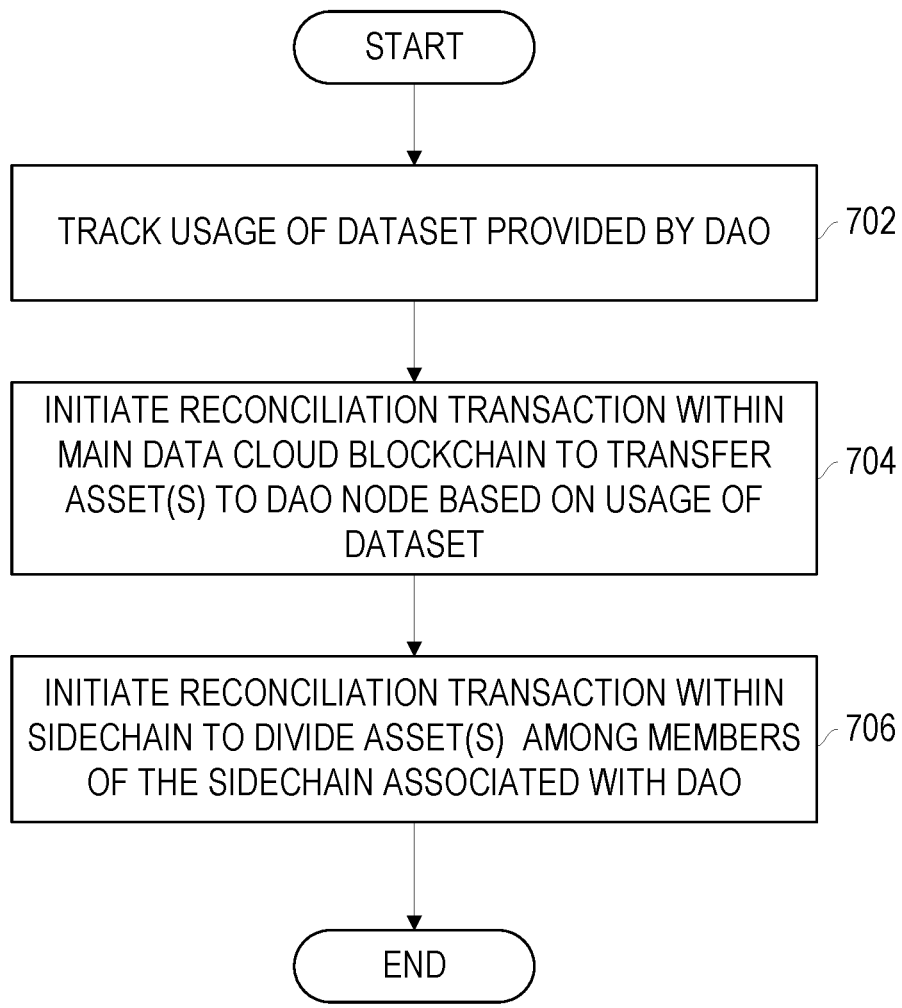
FIG. 7 illustrates an example set of operations for reconciling transactions on a main blockchain and sidechain associated with a DAO in accordance with some embodiments.

FIG. 7 illustrates an example set of operations for reconciling transactions on a main blockchain and sidechain associated with a DAO in accordance with some embodiments. One or more of the steps may be omitted, repeated, and/or performed in a different order. Accordingly, the specific arrangement of steps shown in FIG. 7 should not be construed as limiting the scope of the embodiments.

Referring to FIG. 7, the process tracks usage of a dataset provided by a DAO (operation 702). In some embodiments, analytic services 308 collects performance metrics from web sites or applications where the datasets are used. For example, script tags may be included in code for loading/rendering a campaign message. The script tag may include macros that resolve to reporting various performance metrics. Example performance metrics may include, but are not limited to, impression counting (e.g., a count of the number of times a data set is used to load and render a campaign message on a webpage), a measurement of how much of the rendered campaign message was in-view/visible through the browser/client application (e.g., a percentage value between 0-100, click-through rates for hyperlinks included in the campaign message, likes/positive interactions with the campaign message, an overall effectiveness score of the campaign message, a cost measure, measurements of the data accuracy, etc. The performance metrics may be written by the blockchain program to the distributed ledger on the main data cloud blockchain. Thus, the performance metrics may become part of a block, the contents of which are linked by a cryptographic hash function to one or more other blocks in the ledger.

In some embodiments, the process initiates a reconciliation transaction within the main data cloud blockchain to transfer one or more assets to a DAO node based on usage of the dataset (operation 704). The transaction details may be written to a distributed ledger on the main data cloud blockchain. The reconciliation transaction may further determine how much to transfer to a DAO escrow account based on the performance metrics, as previously noted.

The process further initiates a second reconciliation transaction within a sidechain associated with the DAO to divide (or otherwise distribute) assets among members of the sidechain and associated DAO (operation 706). The assets that are distributed may be the same type of asset or a different type of asset. For example, a cryptocurrency token may be transferred to the DAO's escrow account. The second reconciliation transaction may then divide and distribute the cryptocurrency token or distribute other types of tokens or assets (e.g., loyalty points, etc.).

10. Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or data set, stored by the computer network, is tagged with a tenant ID. A tenant is permitted access to a particular application, data structure, and/or data set only if the tenant and the particular application, data structure, and/or data set are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

11. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
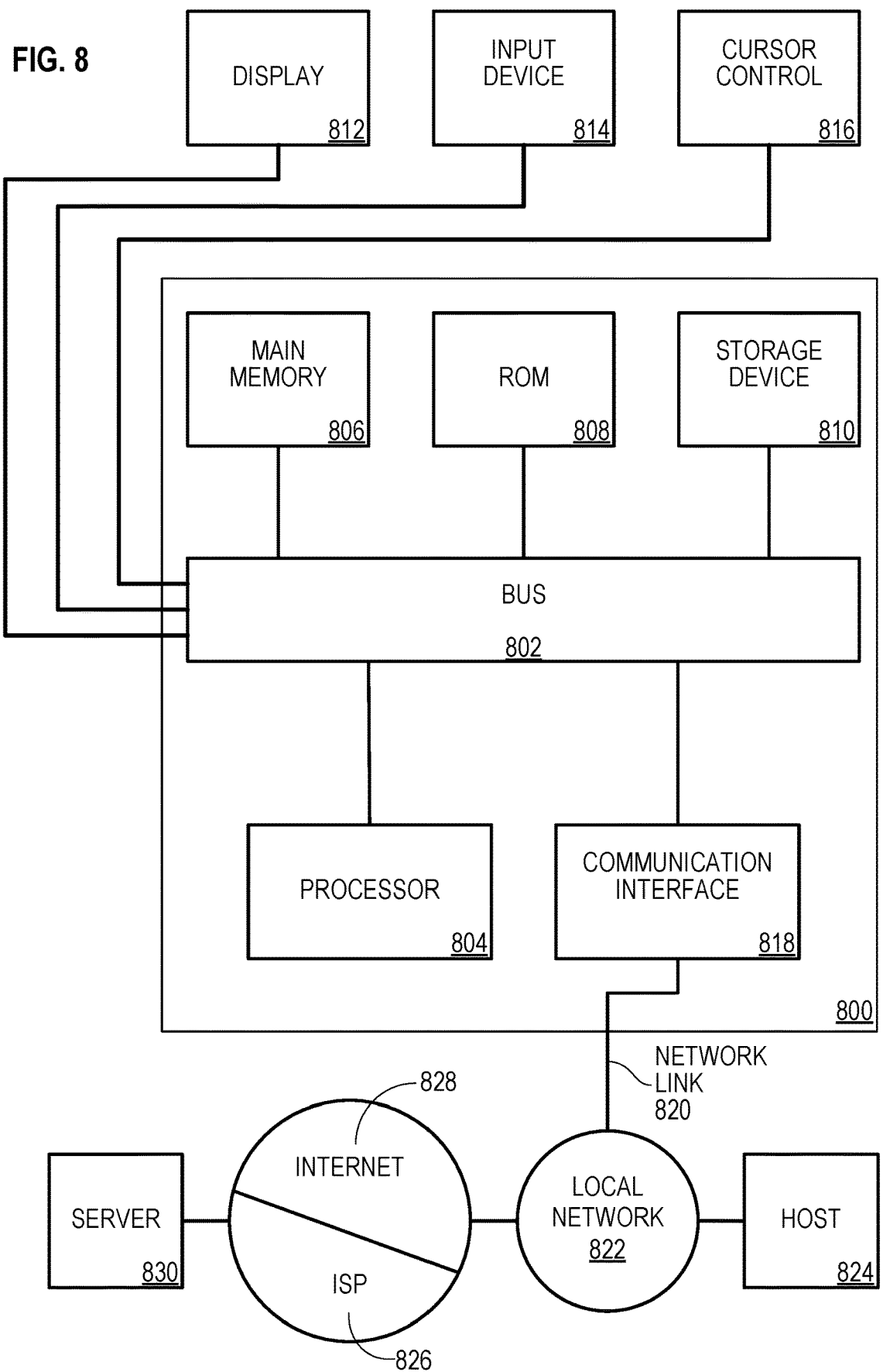
FIG. 8 shows a block diagram that illustrates a computer system in accordance with some embodiments.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general-purpose microprocessor.

Computer system 800 also includes main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

12. Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
  receiving, from an entity, a request to track interactions between members of a cloud-based group and online content;
  wherein the entity is not part of the cloud-based group;
  determining, by at least one server, whether the request is accepted by the cloud-based group based at least in part on a selection to accept or reject the request on behalf of members of the cloud-based group, wherein the selection does not reveal individual identities of the members of the cloud-based group to the at least one server;
  responsive to determining that the request is accepted, monitoring online content interactions on one or more sites for interactions between members of the cloud-based group and the online content, wherein an individual identity of a member of the cloud-based group is not revealed to the at least one server prior to any interaction between the member of the cloud-based group and the online content; and
  updating a set of data based at least in part on detected interactions between members of the cloud-based group and the online content; and
  wherein the set of data identifies one or more attributes of the detected interactions between members of the cloud-based group and the online content;
  wherein the entity does not have access to private group communications of the cloud-based group and the set of data does not provide the entity with access to the private group communications before or after the request is accepted.

2. The method of claim 1, wherein the selection is based on a vote of at least a subset of the members of the group; wherein the set of data does not identify how individual members voted in the vote.

3. The method of claim 1, wherein the request includes a digitized agreement proposal that specifies consideration for tracking interactions between the cloud-based group and the online content; the method further comprising: advertising the digitized agreement proposal to one or more groups that satisfy a set of criteria.

4. The method of claim 3, wherein the digitized agreement proposal specifies proposed consideration for tracking the interactions between the cloud-based group and the online content.

5. The method of claim 3, wherein the digitized agreement is a smart contract that is enforced and executed within a blockchain network.

6. The method of claim 1, further comprising: providing access to an anonymized group identifier responsive to accepting the request; wherein the anonymized group identifier is used to monitor and detect interactions with the online content.

7. The method of claim 1, further comprising: executing one or more reconciliation operations based on the set of data.

8. The method of claim 7, wherein the reconciliation operations include initiating a first transaction to compensate the cloud-based group, wherein responsive to the first transaction, the cloud-based group executes one or more additional transactions to compensate individual members of the group based at least in part on policies agreed on by members of the cloud-based group.

9. One or more non-transitory machine-readable media storing instructions which, when executed by one or more processors, cause:
  receiving, from an entity, a request to track interactions between members of a cloud-based group and online content;
  wherein the entity is not part of the cloud-based group;
  determining, by at least one server, whether the request is accepted by the cloud-based group based at least in part on a selection to accept or reject the request on behalf of members of the cloud-based group, wherein the selection does not reveal individual identities of the members of the cloud-based group to the at least one server;
  responsive to determining that the request is accepted, monitoring online content interactions on one or more sites for interactions between members of the cloud-based group and the online content, wherein an individual identity of a member of the cloud-based group is not revealed to the at least one server prior to any interaction between the member of the cloud-based group and the online content; and updating a set of data based at least in part on detected interactions between members of the cloud-based group and the online content; and wherein the set of data identifies one or more attributes of the detected interactions between members of the cloud-based group and the online content;

wherein the entity does not have access to private group communications of the cloud-based group and the set of data does not provide the entity with access to the private group communications before or after the request is accepted.

10. The media of claim 9, wherein the selection is based on a vote of at least a subset of the members of the group; wherein the set of data does not identify how individual members voted in the vote.

11. The media of claim 9, wherein the request includes a digitized agreement proposal that specifies consideration for tracking interactions between the cloud-based group and the online content; the instructions further causing: advertising the digitized agreement proposal to one or more groups that satisfy a set of criteria.

12. The media of claim 11, wherein the digitized agreement proposal specifies proposed consideration for tracking the interactions between the cloud-based group and the online content.

13. The media of claim 11, wherein the digitized agreement is a smart contract that is enforced and executed within a blockchain network.

14. The media of claim 9, the instructions further causing: providing access to an anonymized group identifier responsive to accepting the request; wherein the anonymized group identifier is used to monitor and detect interactions with the online content.

15. The media of claim 9, the instructions further causing: executing one or more reconciliation operations based on the set of data.

16. The media of claim 15, wherein the reconciliation operations include initiating a first transaction to compensate the cloud-based group, wherein responsive to the first transaction, the cloud-based group executes one or more additional transactions to compensate individual members of the group based at least in part on policies agreed on by members of the cloud-based group.

17. A method comprising:
registering a plurality of groups with a directory service accessible by members of a blockchain network;
advertising a smart contract to at least a subset of one or more of the plurality of groups registered with the directory service;
determining, by the blockchain network, whether a group that is connected to the blockchain network has approved the smart contract;
wherein the smart contract grants a member of the blockchain network access to group data that is anonymized;
wherein the member of the blockchain network is not part of the group;
responsive to determining that the group has approved the smart contract, executing one or more blockchain transactions including at least a first blockchain transaction that updates at least one block of a distributed ledger in the blockchain network based at least in part on the access to the group data that is anonymized and the smart contract.

18. The method of claim 17, wherein determining whether the group that is connected to the blockchain network has approved the smart contract comprises determining a result of a vote of a set of blockchain users included in the group.

19. The method of claim 17, wherein the group is a decentralized autonomous organization (DAO) that is associated with a sidechain network that is run independently of the blockchain network.

20. The method of claim 19, wherein the member is not granted access to the sidechain network.

21. One or more non-transitory machine-readable media storing instructions which, when executed by one or more processors, cause:
registering a plurality of groups with a directory service accessible by members of a blockchain network;
advertising a smart contract to at least a subset of one or more of the plurality of groups registered with the directory service;
determining, by the blockchain network, whether a group that is connected to the blockchain network has approved the smart contract;
wherein the smart contract grants a member of the blockchain network access to group data that is anonymized;
wherein the member of the blockchain network is not part of the group;
responsive to determining that the group has approved the smart contract, executing one or more blockchain transactions including at least a first blockchain transaction that updates at least one block of a distributed ledger in the blockchain network based at least in part on the access to the group data that is anonymized and the smart contract.

22. The media of claim 21, wherein determining whether the group that is connected to the blockchain network has approved the smart contract comprises determining a result of a vote of a set of blockchain users included in the group.

23. The media of claim 21, wherein the group is a decentralized autonomous organization (DAO) that is associated with a sidechain network that is run independently of the blockchain network.

24. The media of claim 23, wherein the member is not granted access to the sidechain network.

* * * * *